(12) United States Patent
Kovacs

(10) Patent No.: US 9,389,488 B1
(45) Date of Patent: Jul. 12, 2016

(54) LENS MOUNTS WITH LOCKING MECHANISMS

(71) Applicant: Sensors Unlimited, Inc., Princeton, NJ (US)

(72) Inventor: Laszlo Kovacs, Middlesex, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 14/717,776

(22) Filed: May 20, 2015

(51) Int. Cl.
*G03B 17/00* (2006.01)
*G03B 17/14* (2006.01)

(52) U.S. Cl.
CPC ........................................ *G03B 17/14* (2013.01)

(58) Field of Classification Search
USPC ......................... 396/529, 533; 359/829, 830
See application file for complete search history.

(56) References Cited

U.S. PATENT DOCUMENTS

| 1,357,996 | A | * | 11/1920 | Koehler | G02B 7/02 359/819 |
| 2,532,300 | A | * | 12/1950 | Harvej | G02B 7/02 359/740 |
| 5,662,445 | A | * | 9/1997 | Harbottle | F16B 39/02 411/288 |
| 5,757,561 | A | * | 5/1998 | Sechrist | C08J 5/18 359/818 |
| 6,337,775 | B1 | | 1/2002 | Wilson | |
| 6,754,013 | B2 | * | 6/2004 | Willis | G02B 7/023 359/819 |
| 6,862,144 | B1 | * | 3/2005 | Aguero | G02B 13/16 359/694 |
| 7,085,491 | B2 | | 8/2006 | Chiang | |
| 7,451,930 | B1 | | 11/2008 | Neff | |
| 7,982,980 | B2 | * | 7/2011 | Rigney | G02B 7/023 359/822 |
| 8,582,020 | B2 | * | 11/2013 | Hoshikawa | G03B 17/14 348/360 |
| 2012/0076487 | A1 | * | 3/2012 | Wu | G03B 17/566 396/533 |
| 2012/0282060 | A1 | | 11/2012 | Chung | |

FOREIGN PATENT DOCUMENTS

WO WO-9910773 A1 3/1999
WO WO 9910773 A1 * 3/1999 ............... G02B 7/14

* cited by examiner

*Primary Examiner* — Clayton E Laballe
*Assistant Examiner* — Warren K Fenwick
(74) *Attorney, Agent, or Firm* — Locke Lord LLP; Scott D. Wofsy; Joshua L. Jones

(57) ABSTRACT

An optical assembly includes a lens mount. The lens mount includes a lens mount body with a threaded lens aperture extending axially therethrough. A ring extends from the lens mount body. The ring defines a lens locking aperture therethrough that is spaced axially apart from the lens aperture and is aligned with the lens aperture. The lens aperture and lens locking aperture are both threaded. A lens element is threaded into the lens aperture and lens locking aperture. A lock operatively connects the lens mount body to the ring for locking the lens element by flexure of the ring relative to the lens aperture.

10 Claims, 3 Drawing Sheets

LENS MOUNTS WITH LOCKING MECHANISMS

BACKGROUND OF THE INVENTION

1. Field of the Invention

The present disclosure relates to optical assemblies, and more particularly to lens mounts such as used in optical assemblies.

2. Description of Related Art

In optical assemblies, movement of individual lens elements affects the image produced by the optical assembly. Such movement can be desirable, for instance when lens elements in a zoom lens move to adjust the zoom level, or when lens elements move to focus an image on an intended subject. However, there are also scenarios where it is desirable to lock lens elements in position, such as after the position of a lens element has been calibrated and is to remain stationary.

Such conventional methods and systems have generally been considered satisfactory for their intended purpose. However, there is still a need in the art for improved lens mounts with locking mechanisms. The present disclosure provides a solution for this need.

SUMMARY OF THE INVENTION

A lens mount includes a lens mount body with a threaded lens aperture extending axially therethrough. A ring extends from the lens mount. The ring defines a lens locking aperture therethrough that is spaced axially apart from the lens aperture and is aligned with the lens aperture. The lens aperture and lens locking aperture are both threaded.

A threaded locking screw bore can be defined in the lens mount body, and a non-threaded bore can be defined through the ring aligned with the locking screw bore. A locking screw can pass through the non-threaded bore of the ring and can be threaded into the locking screw bore of the lens mount body. The ring can be integral with the lens mount body. The ring can be connected to the lens mount body by a flexure joint, wherein a locking screw bore is defined in the lens mount body on a side of the lens aperture opposite the flexure joint. The threads of the lens aperture and of the lens locking aperture can be of the same pitch and direction for receiving a lens element threaded to both.

An optical assembly includes a lens mount body as described above. A lens element is threaded into the lens aperture and lens locking aperture. A lock operatively connects the lens mount body to the ring for locking the lens element by flexure of the ring relative to the lens aperture.

The lock can include a threaded locking screw bore defined in at least one of the lens mount body and the ring, with a locking screw threaded thereto operatively connecting the ring and lens mount body for flexure of the ring relative to the lens aperture. The threaded locking screw bore is defined in the lens mount body, and a non-threaded locking screw bore is defined through the ring aligned with the locking screw bore, wherein the locking screw passes through the non-threaded locking screw bore and is threaded to the threaded locking screw bore.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
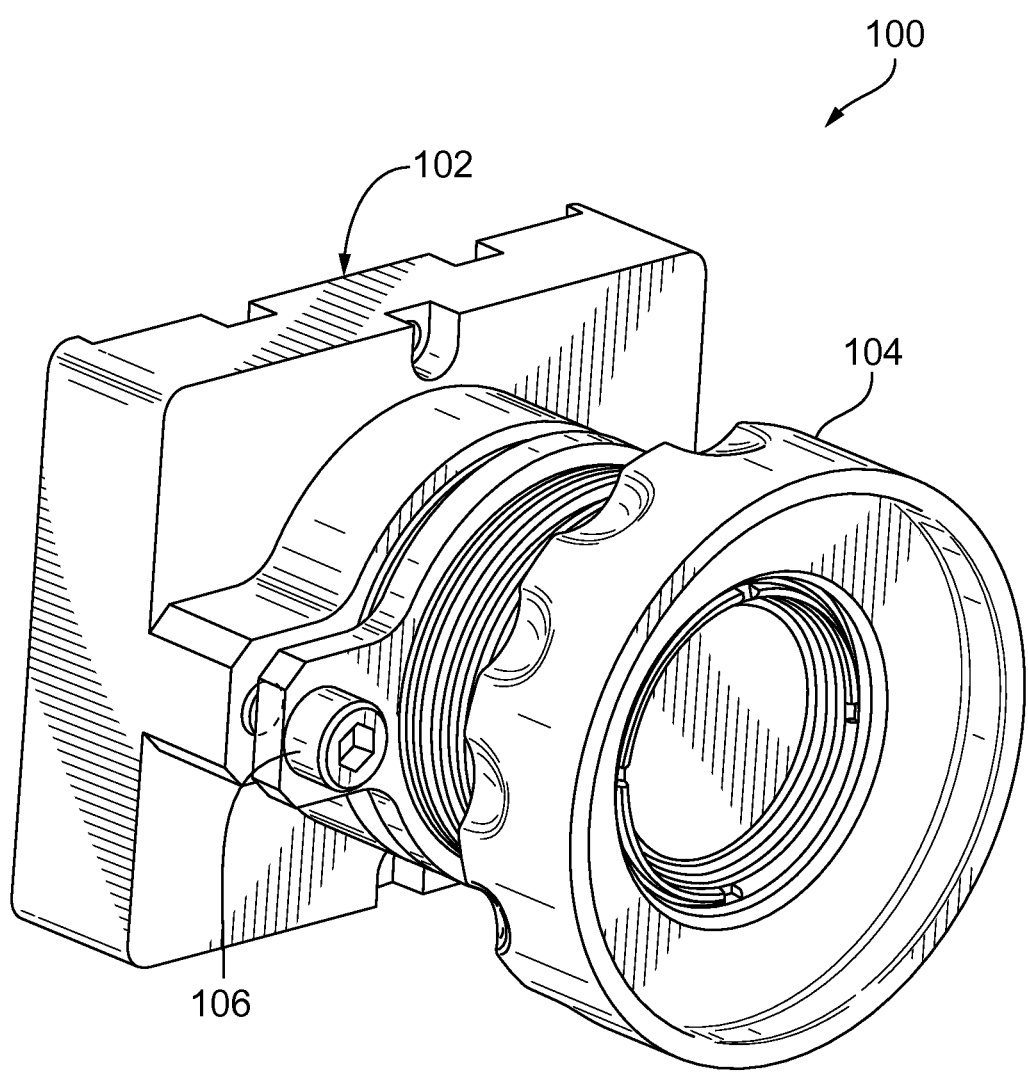
FIG. 1 is a perspective view of an exemplary embodiment of an optical assembly constructed in accordance with the present disclosure, showing the lens mount and a lens element threaded thereto.

Reference will now be made to the drawings wherein like reference numerals identify similar structural features or aspects of the subject disclosure. For purposes of explanation and illustration, and not limitation, a partial view of an exemplary embodiment of an optical assembly in accordance with the disclosure is shown in FIG. 1 and is designated generally by reference character 100. Other embodiments of optical assemblies in accordance with the disclosure, or aspects thereof, are provided in FIGS. 2-3, as will be described. The systems and methods described herein can be used to lock lens elements relative to their respective lens mounts.

Figure 2:
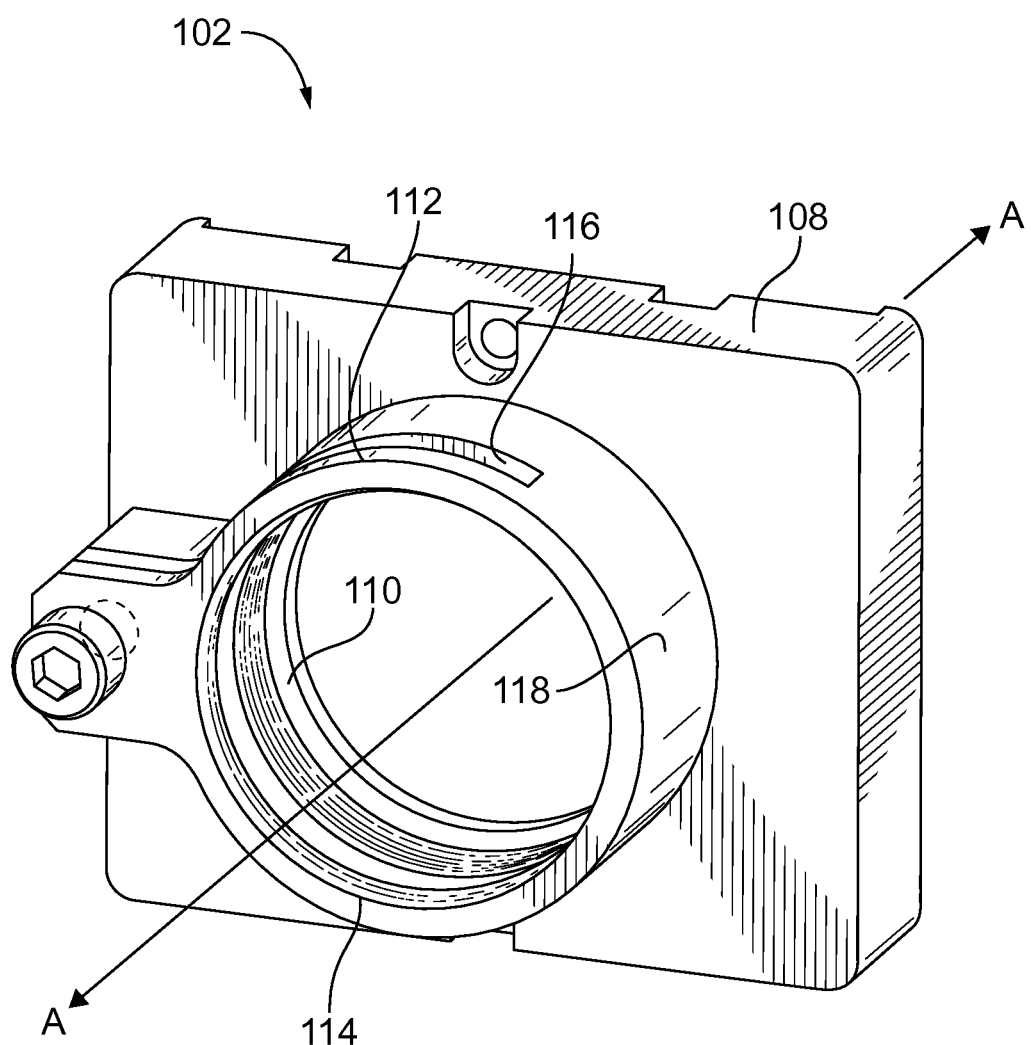
FIG. 2 is a perspective view of the lens mount of FIG. 1, showing the ring and lock.

Optical assembly 100 includes a lens mount 102, a lens element 104, and a locking screw 106. As shown in FIG. 2, lens mount 102 includes a lens mount body 108 with a threaded lens aperture 110 extending axially therethrough along optical axis A. A ring 112 extends from the lens mount body 108. Ring 112 defines a lens locking aperture 114 therethrough that is spaced axially apart from the lens aperture 110 across gap 116 and is aligned with lens aperture 110. Lens aperture 110 and lens locking aperture 114 are both threaded. Ring 112 is integral with the lens mount body 108. Ring 112 is connected to lens mount body 108 by a flexure joint 118. For example, lens body 108 can be formed with a threaded barrel extending therefrom. Gap 116 can be formed in the barrel to separate between lens aperture 110 and ring 112, leaving the portion of the barrel corresponding to flexure joint 118. Those skilled in the art will readily appreciate that ring 112 can be formed by any other suitable process, and that ring 112 can be a separate piece attached to the barrel of lens mount body 108 without departing from the scope of this disclosure. The threads of the lens aperture 110 and of the lens locking aperture 114 are of the same pitch and direction for receiving lens element 104 threaded to both as it is shown in FIG. 3.

Figure 3:
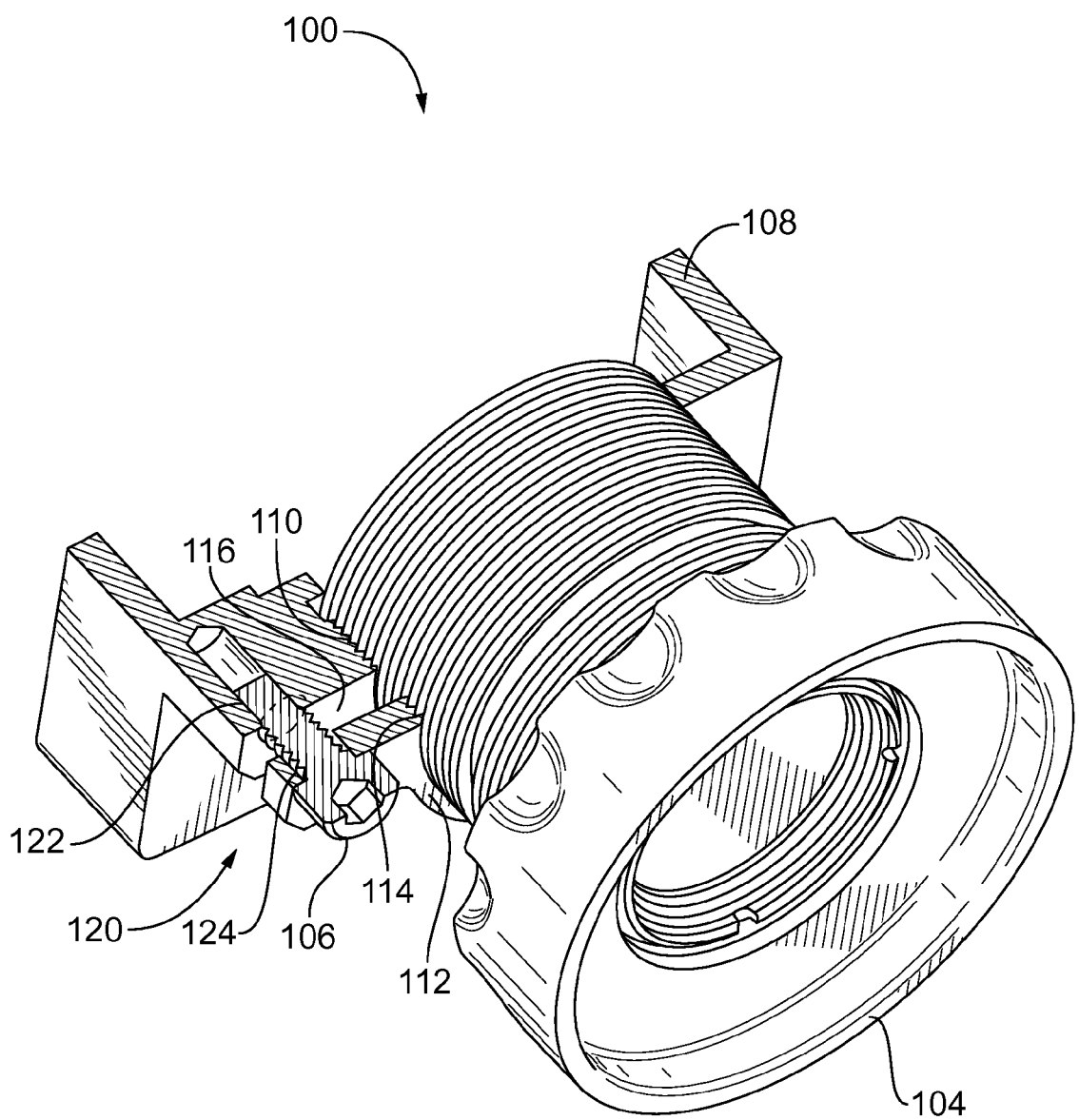
FIG. 3 is a partially cross-sectional view of the optical assembly of FIG. 1, showing the locking screw of the lock.

With continued reference to FIG. 3, a lock 120 operatively connects the lens mount body 108 to ring 112 for locking the lens element 104 by flexure of the ring 112 relative to the lens aperture 110. Lock 120 includes a threaded locking screw bore 122 defined in lens mount body 108. Locking screw 106 is threaded to locking screw bore 122, operatively connecting ring 112 and lens mount body 108 for flexure of ring 112, e.g., by compressing gap 116, thereby compressing the threads of lens element 104. A non-threaded locking screw bore 124 is defined through ring 112 aligned with the locking screw bore 122. Locking screw 106 passes through the non-threaded locking screw bore 124, to avoid interference with the threads of locking screw 106 and ring 112. Lock 120 is defined on a side of the lens aperture 110 opposite the flexure joint 118. Those skilled in the art will readily appreciate that any other suitable type of lock can be used to actuate ring 112 without departing from the scope of this disclosure. For example, the locking screw bore in ring 112 could be threaded and the corresponding bore in lens housing body 108 could be non-threaded, in which case lock 120 could push ring 112 away from lens aperture 110 along optical axis A, with similar effect on binding or locking the threads of lens element 104 as described above.

To adjust the position of lens element 104 along optical axis A, locking screw 106 is loosened. Lens element 104 has the same thread pitch as lens aperture 110 and lens locking aperture 114, so lens element 104 can be twisted so that its threads act to move lens element 104 along optical axis A relative to lens mount body 108. Once lens element 104 is in the proper position relative to lens mount body 108, locking screw 106 is tightened into the threads of locking screw bore 122, compressing the threads of lens element 104 to lock the position of lens element 104 as described above.

The lens mount 102 described herein can be used, for example, as a fixture to support a lens in front of a camera or as part of a camera, e.g., in front of a focal plane array. The system and techniques described herein provide for the function of moving the lens elements, e.g., for focusing to achieve a clear image, and for locking the lens element in position after a clear image is achieved.

The methods and systems of the present disclosure, as described above and shown in the drawings, provide for optical assemblies with superior properties including improved locking of lens elements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A lens mount comprising:
   a lens mount body with a threaded lens aperture extending axially therethrough; and
   a ring extending from the lens mount, wherein the ring defines a lens locking aperture therethrough that is spaced axially apart from the lens aperture and is aligned with the lens aperture, wherein the lens aperture and lens locking aperture are both threaded;
   wherein a threaded locking screw bore is defined in the lens mount, and a non-threaded bore is defined through the ring aligned with the locking screw bore.

2. A lens mount as recited in claim 1, further comprising a locking screw passing through the non-threaded bore of the ring and threaded into the locking screw bore of the lens mount.

3. A lens mount as recited in claim 1, wherein the ring is integral with the lens mount body.

4. A lens mount comprising:
   a lens mount body with a threaded lens aperture extending axially therethrough; and
   a ring extending from the lens mount, wherein the ring defines a lens locking aperture therethrough that is spaced axially apart from the lens aperture and is aligned with the lens aperture, wherein the lens aperture and lens locking aperture are both threaded;
   wherein the ring is integral with the lens mount body, wherein the ring is connected to the lens mount body by a flexure joint, and wherein a locking screw bore is defined in the lens mount body on a side of the lens aperture opposite the flexure joint.

5. A lens mount comprising:
   a lens mount body with a threaded lens aperture extending axially therethrough; and
   a ring extending from the lens mount, wherein the ring defines a lens locking aperture therethrough that is spaced axially apart from the lens aperture and is aligned with the lens aperture, wherein the lens aperture and lens locking aperture are both threaded, wherein the threads of the lens aperture and of the lens locking aperture are of the same pitch and direction for receiving a lens element threaded to both.

6. An optical assembly comprising:
   a lens mount body with a threaded lens aperture extending axially therethrough, with a ring extending from the lens mount, wherein the ring defines a lens locking aperture therethrough that is spaced axially apart from the lens aperture and is aligned with the lens aperture, wherein the lens aperture and lens locking aperture are both threaded;
   a lens element threaded into the lens aperture and lens locking aperture; and
   a lock operatively connecting the lens mount to the ring for locking the lens element by flexure of the ring relative to the lens aperture, wherein the lock includes a threaded locking screw bore defined in at least one of the lens mount body and the ring, with a locking screw threaded thereto operatively connecting the ring and lens mount body for flexure of the ring relative to the lens aperture.

7. An optical assembly as recited in claim 6, wherein the threaded locking screw bore is defined in the lens mount, and a non-threaded locking screw bore is defined through the ring aligned with the locking screw bore, wherein the locking screw passes through the non-threaded locking screw bore and is threaded to the threaded locking screw bore.

8. An optical assembly as recited in claim 6, wherein the ring is integral with the lens mount body.

9. An optical assembly comprising:
   a lens mount body with a threaded lens aperture extending axially therethrough, with a ring extending from the lens mount, wherein the ring defines a lens locking aperture therethrough that is spaced axially apart from the lens aperture and is aligned with the lens aperture, wherein the lens aperture and lens locking aperture are both threaded;
   a lens element threaded into the lens aperture and lens locking aperture; and a lock operatively connecting the lens mount to the ring for locking the lens element by flexure of the ring relative to the lens aperture, wherein the ring is integral with the lens mount body, wherein the ring is connected to the lens mount by a flexure joint, and wherein a locking screw bore is defined in the lens mount body on a side of the lens aperture opposite the flexure joint.

10. An optical assembly comprising:
    a lens mount body with a threaded lens aperture extending axially therethrough, with a ring extending from the lens mount, wherein the ring defines a lens locking aperture therethrough that is spaced axially apart from the lens aperture and is aligned with the lens aperture, wherein the lens aperture and lens locking aperture are both threaded;
    a lens element threaded into the lens aperture and lens locking aperture; and a lock operatively connecting the lens mount to the ring for locking the lens element by flexure of the ring relative to the lens aperture, wherein the threads of the lens aperture and of the lens locking aperture of the same pitch and direction for receiving a lens element threaded to both.

* * * * *